United States Patent [19]

Arnold

[11] E Patent Number: Re. 32,621

[45] Reissued Date of Patent: Mar. 15, 1988

[54] FRAME GIRDER FOR UNDERGROUND DRIFT AND SHAFT CONSTRUCTION

[75] Inventor: Edgar Arnold, Büron, Switzerland

[73] Assignee: Pantex-Stahl AG, Büron, Switzerland

[21] Appl. No.: 607,058

[22] Filed: May 4, 1984

Related U.S. Patent Documents

Reissue of:

[64] Patent No.: 4,335,556
Issued: Jun. 22, 1982
Appl. No.: 140,531
Filed: Apr. 15, 1980

[30] Foreign Application Priority Data

Apr. 18, 1979 [CH] Switzerland ..... 3649/79

[51] Int. Cl.[4] ..... E04H 12/10; E04C 3/02

[52] U.S. Cl. ..... 52/655; 52/694

[58] Field of Search ..... 52/648, 655, 693, 694, 52/637, 638, 639

[56] References Cited

U.S. PATENT DOCUMENTS 2,098,343 11/1937 Lawton ..... 52/655 X
3,727,362 4/1973 Ellison et al. ..... 52/648
4,054,013 10/1977 Pitto et al. ..... 52/694 X

FOREIGN PATENT DOCUMENTS 1098003 7/1955 France ..... 52/655
417020 1/1967 Switzerland ..... 52/655

*Primary Examiner*—J. Karl Bell
*Attorney, Agent, or Firm*—Pollock, Vande Sande & Priddy

[57] ABSTRACT

The frame girder for underground drift construction comprises three or more retainer bars (3a, 3b) whose cross sections form a polygon, the retainer bars being affixed to one another by stiffener elements (4). Each stiffener element (4) comprises a number of cross struts (5) bent in their centers and inclined with respect to the retainer bars. The outer ends (9) of the struts (5) are each attached to one of the retainer bars. The stiffener element may be formed symmetrically with respect to a central plane extending obliquely to the retainer bars. The frame girder may be made from conventional round irons. It resists bending, torsion and buckling at very high loads, and no undesirable injection shadows are produced during concreting.

4 Claims, 21 Drawing Figures

FRAME GIRDER FOR UNDERGROUND DRIFT AND SHAFT CONSTRUCTION

Matter enclosed in heavy brackets [ ] appears in the original patent but forms no part of this reissue specification; matter printed in italics indicates the additions made by reissue.

The invention relates to a frame girder for underground drift and shaft construction, wherein three or more retainer bars forming a polygonal cross section are immovably attached relative to one another by means of interior stiffening elements.

Such frame girders are used in underground drift construction. In comparsion with prior art frame structures comprising rolled sections, they have a higher load capacity and a better compound effect in concrete. Their meter weight is also less, which simplifies handling. The frame structures comprising rolled sections have the further disadvantage that injection shadows may be formed during injection of the concrete, resulting in weakened areas and cavities in the concrete structure.

Frame girders comprising mutually welded reinforcement rods are known from Austrian Pat. No. 258,837. These frame girders comprise three or more retainer bars forming a polygonal cross section, surrounded by connecting yokes arranged in zig-zag form. Load experiments have shown, however, that the resistance to buckling of these known frame girders is insufficient. The retainer bars tend to bulge or to buckle laterally. Their welded joints can separate, so that the yokes are sheared off.

In order to enhance the rigidity and load bearing capacity of prior art frame girders, it has been suggested in German Published Application No. 2,709,242 to reinforce the girder interiors. For this purpose, shell bodies rigid as to both form and dimension are attached at the interior of the frame girders. The shell bodies fix the relative spatial relationship of the retainer bars. However, the shell bodies, being manufactured from pressed sheet metal, are relatively expensive and, because of the width necessary for rigidity, cause undesirable injection shadows during application of the concrete.

It is an object of the invention to avoid these disadvantages and to produce a frame girder which can be manufactured commercially from available steel rounds and which produces no injection shadows during injection of the concrete. The frame girder is to resist bending, bucking and torsion even under very heavy loads, so it will not be damaged even where used for supporting loads at great elevations and under strong pressures.

This object is accomplished by forming each stiffening element from struts buckled at their centers and corresponding in number to the number of retainers, the struts being inclined toward the vault bars and being attached by their outer ends to respective ones of the retainer bars. Where appropriate, each stiffening element is formed symmetrically with respect to a central plane extending obliquely to the retainer bars.

Figure 1:
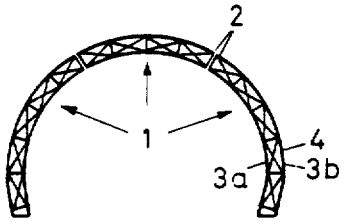
Figure 2:
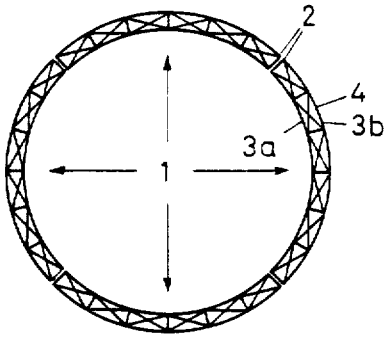
Figure 3:
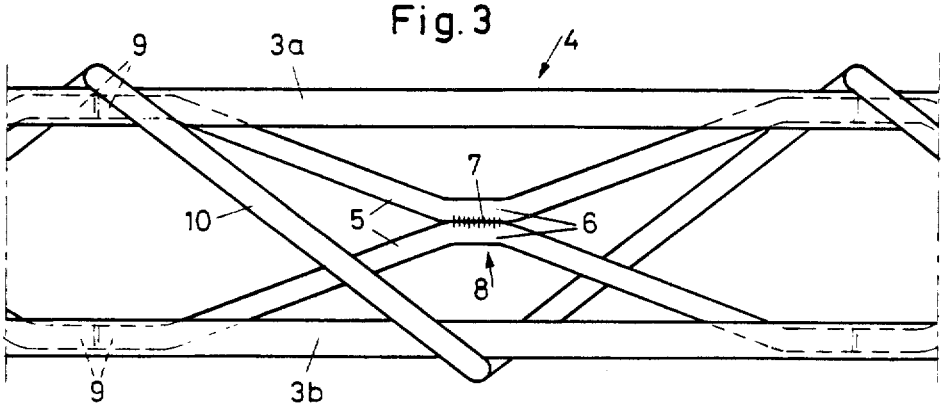
Figure 4:
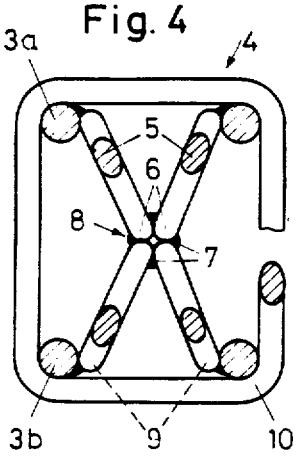
Figure 5:
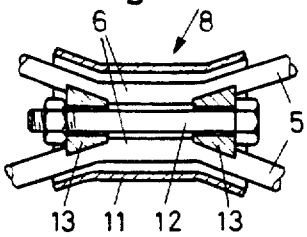
Figure 6:
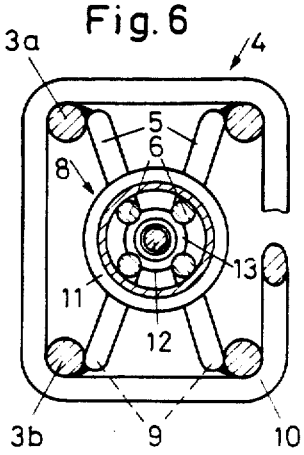
Figure 7:
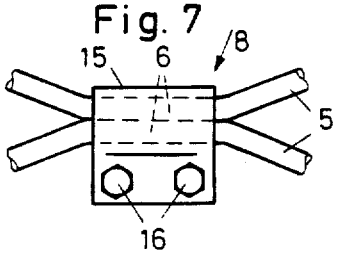
Figure 8:
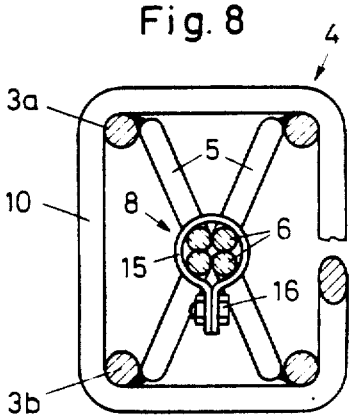
Figure 9:
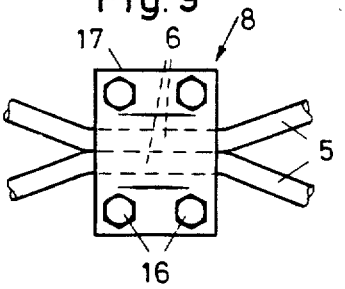
Figure 10:
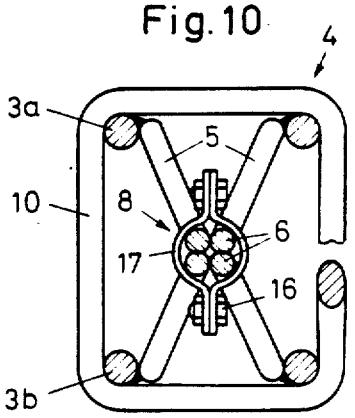
Figure 11:
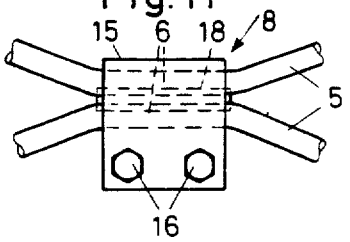
Figure 12:
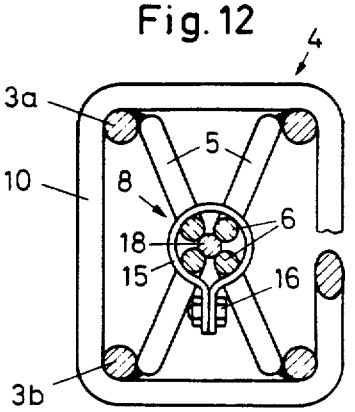
Figure 13:
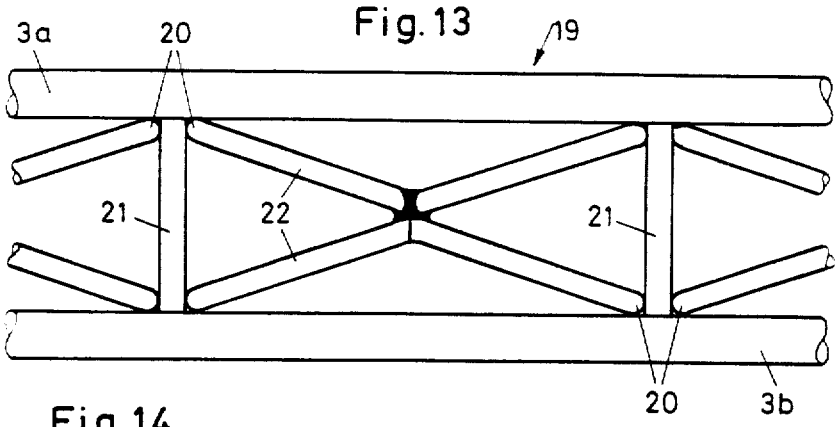
Figure 14:
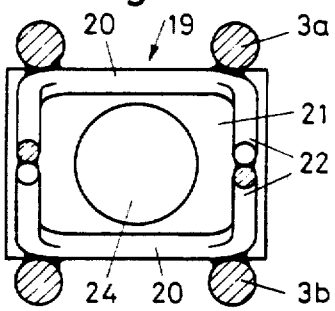
Figure 15:
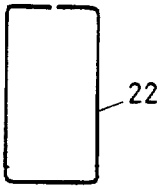
Figure 16:
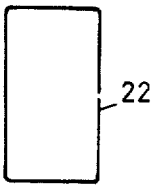
Figure 17:
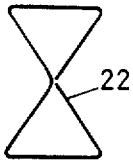
Figure 18:
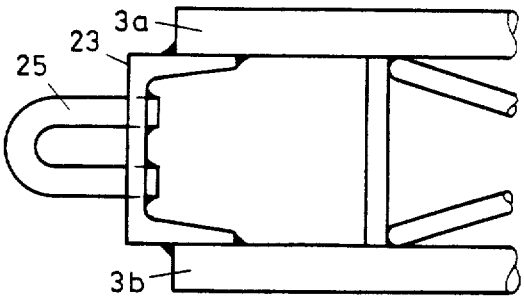
Figure 19:
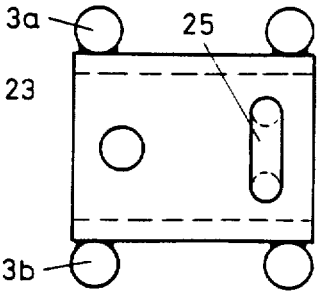
Figure 20:
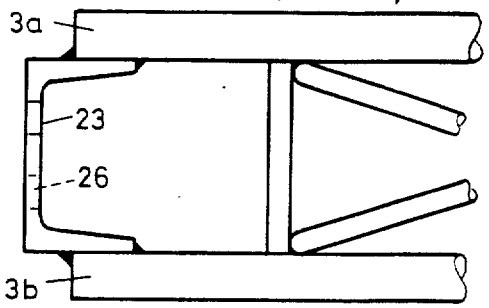
Figure 21:
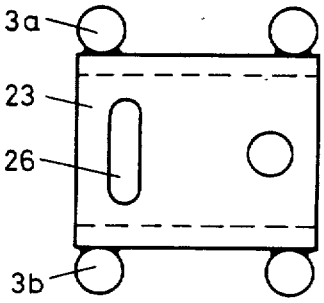

Embodiments of the invention will now be described with reference to the drawings, which show in:

FIG. 1 an arcuate frame structure comprising several frame girder segments;

FIG. 2 an annular frame structure comprising several frame girder segments;

FIGS. 3 and 4 an elevation and cross sectional view of a first embodiment of a frame girder segment;

FIGS. 5 and 6 a second embodiment of a frame girder segment;

FIGS. 7 and 8 a third embodiment of a frame girder segment;

FIGS. 9 and 10 a fourth embodiment of a frame girder segment;

FIGS. 11 and 12 a fifth embodiment of a frame girder segment;

FIGS. 13 and 14 a sixth embodiment of a frame girder segment;

FIGS. 15 to 17 bending of iron rounds for the struts of the frame girder segment according to FIGS. 13 and 14; and FIGS. 18 to 21 the two end portions of a frame girder segment, shown in cross section and in elevation.

The frame girder according to FIG. 1 comprises three frame girder segments 1 which are assembled into an arcuate frame, e.g., for the section structure of a tunnel. The division into individual segments facilitates transport and handling. Segments 1 are assembled in situ, the ends 2 of the segments being abutted and combined in a manner to be described hereinbelow.

As illustrated by FIG. 2, construction in annular form is also possible without difficulty. For this purpose, a number of frame girder segments are connected to form a closed circle. Each frame girder segment 1 comprises four retainer bars—two inner bars 3a and two outer bars 3b—spatially fixed relative to one another by stiffener elements 4.

Thus, the uppermost frame girder segment 1 of the arch according to FIG. 1 comprises four stiffener element 4, while the lateral segments each comprise five stiffener element 4. The frame girder segments for the ring according to FIG. 2 each comprise six stiffener elements 4.

In the first embodiment of the frame girder according to FIGS. 3 and 4, the upper retainers 3a and the lower retainers 3b, as seen in cross section, enclose a rectangle. Stiffener element 4 comprises four identical struts 5 which are bent at their centers 6 and there welded together in cruciform shape. The weld can be in the nature of, e.g., resistance welding or autogenous welding. The center portions 6 and the weld seam 7 form a joint 8.

In spatial terms, struts 5 of stiffener element 4 correspond to the edges of two quadrilateral, symmetrically arranged pyramids, whose tips are in contact.

The free ends 9 of each of struts 5 can additionally be welded to one of retainer bars 3a, 3b. To further strengthen the frame girder segment, the same is continuously helically wound with a thick wire 10, so that the outer retainer bars cannot be pressed apart upon application of a load. The wire winding is in zig-zag form, and the points of contact with the retainer bars are also welded. Winding 10 is so arranged that the weld points at least partly coincide with the welds of the strut ends 9. Since joint 8 is heavily loaded, welding must be done carefully in order to avoid ruptures.

In place of welding, the central connection of cross struts 5 can also be accomplished by means of an adapter sleeve 11. The inner bore of the adapter sleeve must be sufficiently wide to permit insertion of preformed struts 5 during mounting (see FIGS. 5 and 6). After emplacement of struts 5, a threaded bolt with two cones 13 is pressed into the interior of adapter sleeve 11, whereby the central portions 6 are clamped within the adapter sleeve. The outer ends of the struts are again welded to the retainer bars, and then the zig-zag shaped enclosure 10 is attached as in the first embodiment.

In the third embodiment according to FIGS. 7 and 8, the juncture 8 is achieved by means of a unitary clamping member 15 which is braced by two screws 16. This clamping member 15 must be forced apart for insertion of struts 5. Such forcing apart can be obviated by use of a double-shelled clamping member 17, as shown in FIGS. 9 and 10. In this embodiment the two shells of the clamping member can simply be placed about the central portions 6 and screwed together.

If the juncture 8 is to be subjected to very high loads, a filler piece 18 can be inserted between the straight central portions 6, as shown in FIGS. 11 and 12. Because of the filler piece, higher static friction is obtained between central portions 6.

The stiffener element 19 according to FIGS. 13 and 14 again comprises four struts 22, which are arranged in inclined position with respect to retainer bars 3a, 3b. Each two struts 22 are welded together at their centers and form a planar cross. They are located each in one of the lateral planes of the frame girder segments. The four struts 22 are not all joined together at an inner juncture point as in the other embodiments.

At both ends of stiffener elements 19, square plates 21 are arranged obliquely with respect to retainer bars 3a, 3b, the inner sides of which they contact. The end portions 20 of struts 22 are so angled that at least portions thereof extend parallel to the edges of plates 21. The end portions rest on the plates and are welded thereto.

Plates 21 serve for the transmission of power and to increase the resistance to twisting of element 19, so the additional zig-zag shaped wire winding of the retainer bars is unnecessary. This embodiment is therefore economical to produce and particularly resistant to torsion.

According to a further embodiment, each two struts 22 can advantageously be formed as one piece. This is [donw] *done* by bending a round iron bar into a rectangle (FIGS. 15 and 16) whose longer sides are then bent inwardly at their centers (FIG. 17). The joint can be either in the center (FIG. 16) or in the end portion (FIG. 15). One or more holes 24 are made in transverse plates 21 in order to prevent the formation of injection shadows during concreting.

As a variant of this embodiment, the round iron bar shown in FIG. 17 could be so further treated that the two triangles whose apices are in contact are relatively [erotated] *rotated* about 90° and are somewhat buckled. The struts would then comprise two such triangle pairs whose apices are welded together and whose base corners are welded to the retainer bars. This would provide support for the height and breadth of the frame girder, and the transverse plates could be omitted.

The shearing stress produced in the joint by bending is then transmitted not only by the weld but also through the strut material itself.

For rational production of the frame girder segments, it is advisable to prepare the stiffener elements of the various embodiments in advance in special templates.

The upper and lower retainer bars 3a, 3b are then bent to the desired radius of curvature and fixed in their relative positions by welding on U-shaped end plates 23. The U-shaped end plates 23 are preferable to conventional flat plates, since small differences in the lengths of the retainer bars can easily be compensated. Stiffener elements 4, 19, are now inserted at a distance from one another between the retainer bars and are welded together either manually or with a welding machine. In the case of embodiments comprising a zig-zag shaped wire enclosure, the latter is then applied in a continuous operation.

The completed frame girder segments are connected together in situ. this is accomplished by pushing their end portions together, whereupon a staple 25 of one end plate 23 enters a corresponding slit 26 in the adjacent end plate. Insertion of a wedge in staple 25 causes the frame girder segments to be provisionally attached to one another. A more permanent connection is then achieved by screwing together end plates 23 (not shown).

The advantages of the frame girders described hereinabove will now be summarized once more. The frame girder segments are assembled from concrete reinforcement iron, and their form can be adapted to local conditions and the required official tolerances. Because of the use of standard commercial steel rounds, manufacture is particularly economical. Although the illustrated embodiments show and describe only frame girders with four retainer bars, it would certainly be possible to use five or more retainer bars which, in cross section, form a polygon in whose interior the stiffener elements are arranged.

Interior stiffening facilitates a very high load to be applied to the frame girder without bending, buckling or torsion. During load trails, buckling of the frame girders and/or local, lateral bending of the upper retainer bars occurred only at much greater loads than in the case of prior art frame girders. The weld seams remained intact and were not sheared off.

The frame girders according to the invention are very light, easy to grip and simple to construct. Their connection with the concrete is perfect, and the concrete structure is not interrupted by weakened areas, like those resulting from injection shadows. The frame girders are particularly well suited for modern tunnel construction and can be made to resist bending even at great support heights.

I claim:

1. Frame girder *as support* for *and concrete reinforcement in* underground drift and shaft construction, comprising (a) at least three retainer bars forming a polygon in cross section;

(b) means for connecting said retainer bars in fixed, spaced relation to one another, said means comprising struts [corresponding in number to the number of retainer bars,], each [said strut being] bent so as to define a central [connecting] region and two terminal regions inclined toward [the] *a* corresponding retainer bar, said struts being located interiorly of said polygon formed by the cross sections of said retainer bars, the central connecting regions of said struts being rigidly connected together to form a strut cruciform [with a central stiffening joint], the outer end of each said strut being attached to a said retainer bar [.];

(c) *whereby said strut cruciform constitutes a sole element attached to all of said retainer bars and transmitting stresses to said retainer bars.*

2. Frame girder according to claim 1, wherein said center sections of said struts are welded together.

3. Frame girder according to claim 1, characterized in that the outer ends of said struts are welded to said retainer bars.

4. Frame girder according to claim 1, wherein said at least one stiffener element is symmetrical with respect to a central plane extending obliquely to said retainer bars.

* * * * *